«12» United States Patent
Helak et al.

(10) Patent No.: US 9,037,815 B2
(45) Date of Patent: May 19, 2015

(54) ANALYZING AND REDUCING DUMP DATA

(75) Inventors: Dustin A. Helak, Tucson, AZ (US);
Miguel A. Perez, Tucson, AZ (US);
David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 13/536,655

(22) Filed: Jun. 28, 2012

(65) Prior Publication Data

US 2014/0006732 A1 Jan. 2, 2014

(51) Int. Cl.
*G06F 12/00* (2006.01)
*G06F 9/00* (2006.01)

(52) U.S. Cl.
CPC ........................................ *G06F 9/00* (2013.01)

(58) Field of Classification Search
None
See application file for complete search history.

(56) References Cited

U.S. PATENT DOCUMENTS 4,945,480 A * 7/1990 Clark et al. ........................ 711/6
2003/0204825 A1 10/2003 Chang
2004/0034750 A1 * 2/2004 Horn .............................. 711/156
2004/0230763 A1 * 11/2004 Cohen et al. .................... 711/170
2005/0034018 A1 * 2/2005 D'Angelo et al. ............... 714/25
2006/0225044 A1 * 10/2006 Lewis ............................ 717/127
2009/0089791 A1 * 4/2009 Benhase et al. ............... 718/104
2009/0271663 A1 10/2009 Vining
2010/0095101 A1 * 4/2010 Derdak et al. ................. 712/228
2010/0174947 A1 7/2010 Caffrey et al.
2010/0180156 A1 7/2010 Aranguren et al.
2011/0264960 A1 10/2011 Cho

FOREIGN PATENT DOCUMENTS

CN 101944059 1/2011
KR 20110117806 10/2011

OTHER PUBLICATIONS

Hughes, MA et al, Control Program for Providing Prioirity Tasking, IBM Technical Disclosure Bulletin, Apr. 1, 1980.*
N.G. Lenz, "A knowledge-based system for MVS dump analysis", IBM Systems Journal, vol. 30, No. 3, 1991, pp. 336-350.

* cited by examiner

*Primary Examiner* — Duc Doan
(74) *Attorney, Agent, or Firm* — Kunzler Law Group

(57) ABSTRACT

For analyzing and reducing dump data, an analysis module identifies each abending task of a job and identifies each stack block of each abending task. A dump module saves only stack block data from the identified stack blocks as dump data.

17 Claims, 7 Drawing Sheets

| Process Name 240a | Start Address Field 245a | End Address Field 250a |
|---|---|---|
| Process Name 240b | Start Address Field 245b | End Address Field 250b |
| Process Name 240c | Start Address Field 245c | End Address Field 250c |
| Process Name 240d | Start Address Field 245d | End Address Field 250d |
| Virtual Local Storage Map 230 | | |

FIG. 6

ANALYZING AND REDUCING DUMP DATA

FIELD

The subject matter disclosed herein relates to data analysis and reduction and more particularly relates to dump data analysis and reduction.

BACKGROUND

1. Description of the Related Art

It is often desirable to save a state of computer processes, particularly when a process hangs or terminates abnormally. The saved state can be used to diagnosis a cause of a problem.

BRIEF SUMMARY

A method for analyzing and reducing dump data is disclosed. An analysis module identifies each abending task of a job and identifies each stack block of each abending task. A dump module saves only stack block data from the identified stack blocks as dump data. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a schematic block diagram illustrating one embodiment of a virtual local storage map;

DETAILED DESCRIPTION

Figure 1:
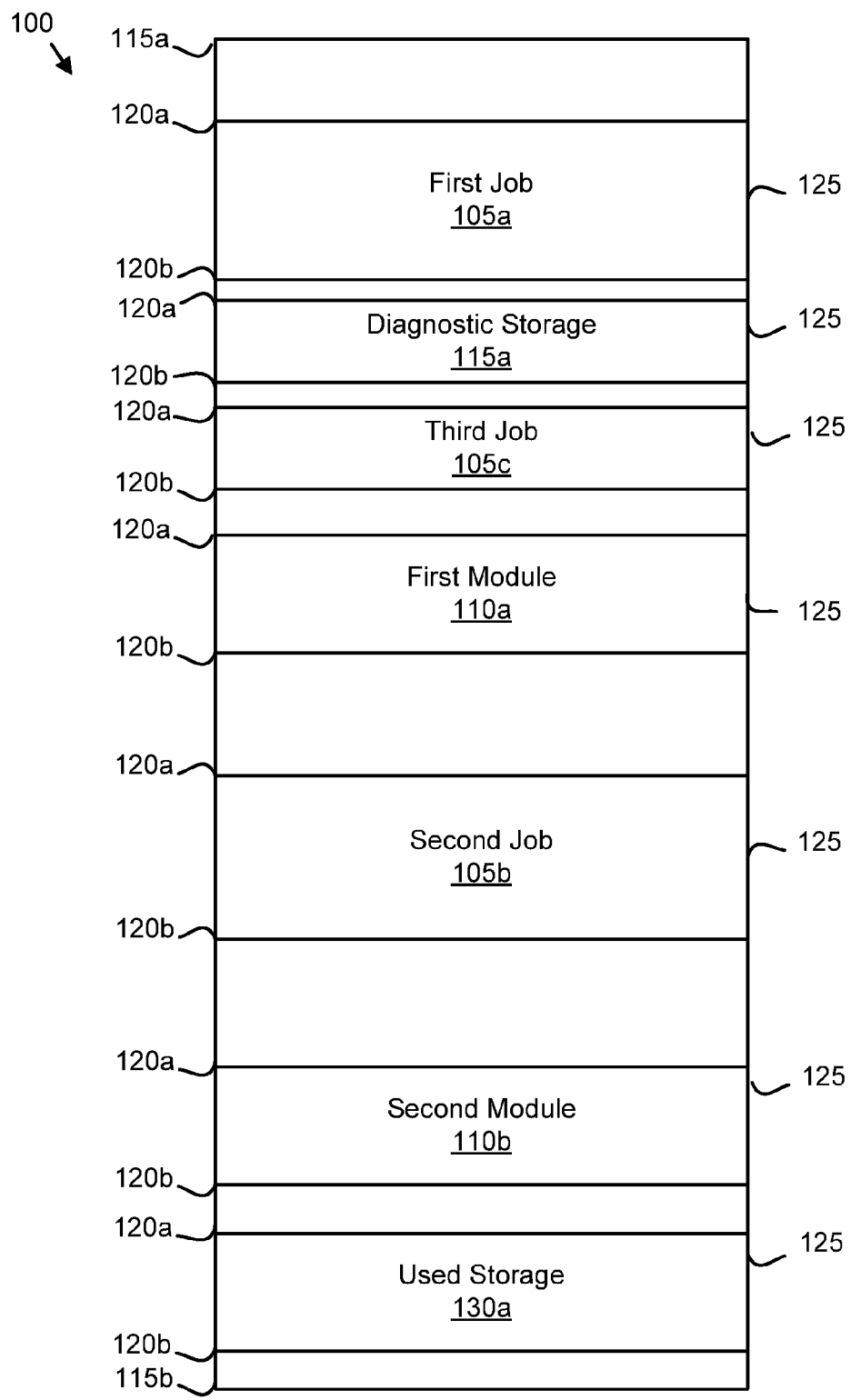
FIG. 1 is a schematic block diagram illustrating one embodiment of an address space.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

FIG. 1 is a schematic block diagram illustrating one embodiment of an address space 100. The address space 100 may be for a Z/OS® file system produced by International Business Machines of Armonk, New York. The address space 100 includes a plurality of memory spaces. The memory spaces may store data in semiconductor registers, hard disk drive lines, optical storage device storage spaces, or combinations thereof. The address space 100 may contain a plurality of processes for one or more software applications. In the depicted embodiment, the processes include jobs 105, modules 110, diagnostic storage 115, and used storage 130. One of skill in the art will recognize that the embodiments may be practiced with other types of processes.

Each process includes a start address 120*a* and an end address 120*b*. Although for simplicity each process is depicted as a contiguous block, a process may be divided among a plurality of blocks. Each block may have a unique start address 120*a* and the unique end address 120*b*. In one embodiment, a pointer 125 points to a current address within a process.

Occasionally, a process such as the first job 105*a* may terminate abnormally or otherwise malfunction. Such an abnormal termination is referred to herein as an abend. In the past, when an abend occurred, the address space 100 relating to the process that abended would be saved as dump data. Unfortunately, the memory spaces allocated to the abending process and the resulting dump data files and were often intractably large. The embodiments described herein analyze and reduce the data for a data dump to allow the relevant data to be more easily recovered.

Figure 2:
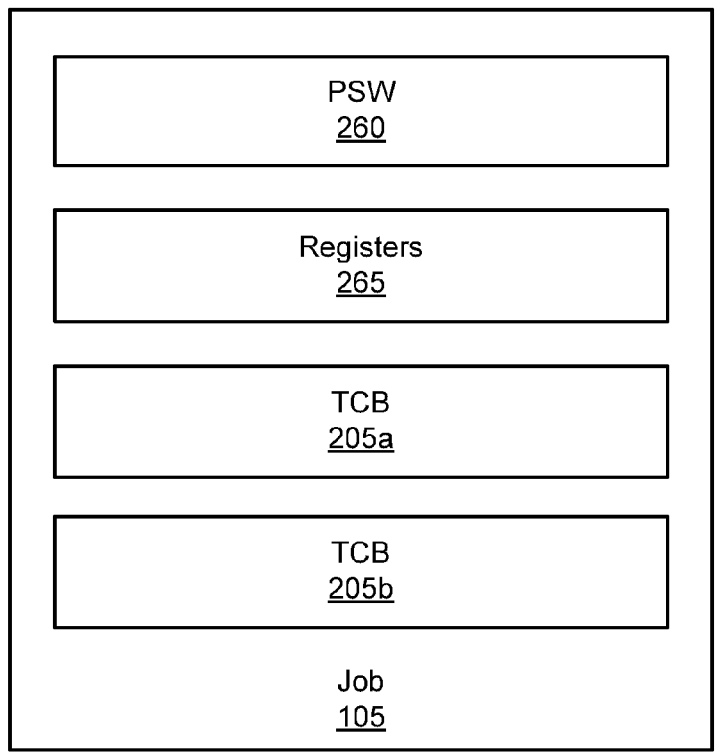
FIG. 2 is a schematic block diagram illustrating one embodiment of a job.

FIG. 2 is a schematic block diagram illustrating one embodiment of a job 105. The job 105 is the job 105 of FIG. 1. The job 105 includes a program status word 260, one or more registers 265, and one or more task control blocks 205. The program status word 260 may include a hardware storage register. In one embodiment, the program status word 260 stores a Wait, Length, Interrupt Code (WLIC). The WLIC may describe how long the software instruction is and identify if the software instruction is a service call or program interrupt.

The registers 265 may be hardware registers, software registers, or combinations thereof. The task control blocks 205 may comprise one or more memory spaces within the address space 100 and will be described hereafter.

Figure 3:
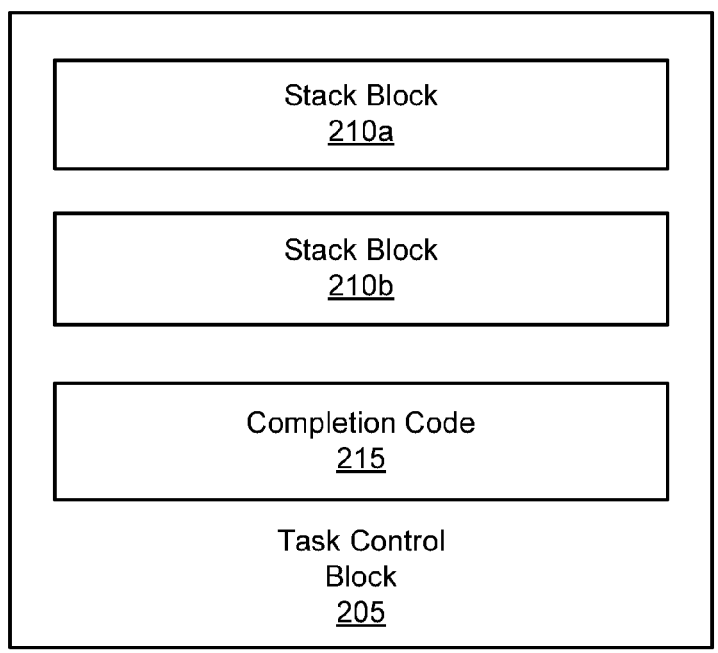
FIG. 3 is a schematic block diagram illustrating one embodiment of a task control block.

FIG. 3 is a schematic block diagram illustrating one embodiment of a task control block 205. The task control block 205 is the task control block 205 of FIG. 2. Each TCB 205 may manage a task for the job 105. Thus a multi-tasked job 205 may have a plurality of TCBs 205. A task may be a thread, a routine, or the like. Any one of the tasks managed by the TCBs 205 may experience a failure.

The task control block 205 includes one or more stack blocks 210 and a completion code 215. Each stack block 210 may manage a thread, a process, a function call, or the like for the job. A stack block 210 may store data relating to the job 105. In one embodiment, a stack block 210 is a request block 235 as will be described hereafter. Alternatively, a stack block 210 may be a linkage stack entry 212 as will be described hereafter. The completion code 215 may indicate an error. For example, a specified code may indicate an abend.

Figure 4:
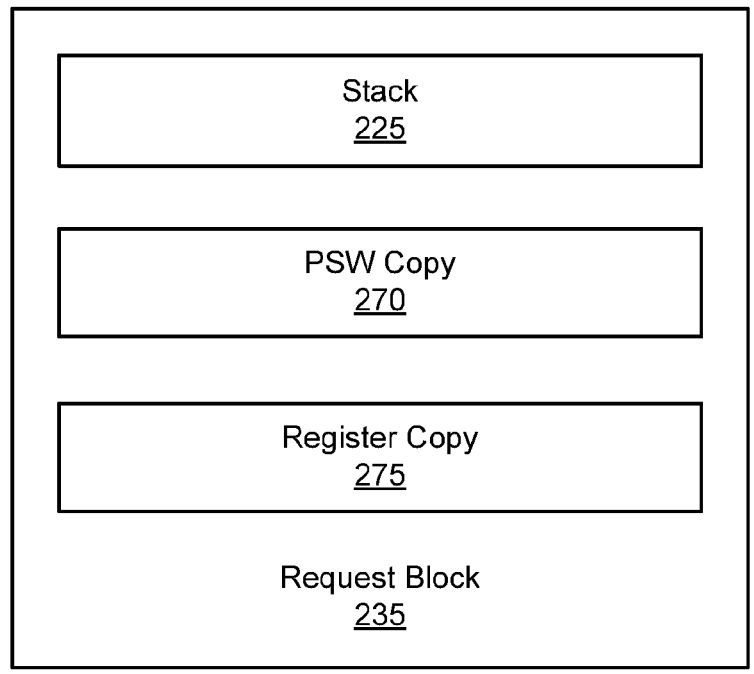
FIG. 4 is a schematic block diagram illustrating one embodiment of a request block.

FIG. 4 is a schematic block diagram illustrating one embodiment of a request block 235. The request block 235 may be the stack block 210 of FIG. 3. The request block 235 includes a stack 225 storing data. The stack 225 may have a last-in-last-out storage architecture. In addition, the request block 235 includes a program status word copy 270 that is a copy of the program status word 260. In one embodiment, the program status word copy 270 is snap shot copy of the program status word 260 when the request block 235 is created.

In addition, the request block 235 may include a register copy 275 that is a copy of the registers 265. In one embodiment, the register copy 275 is snap shot copy of the registers 265 when the request block 235 is created.

Figure 5:
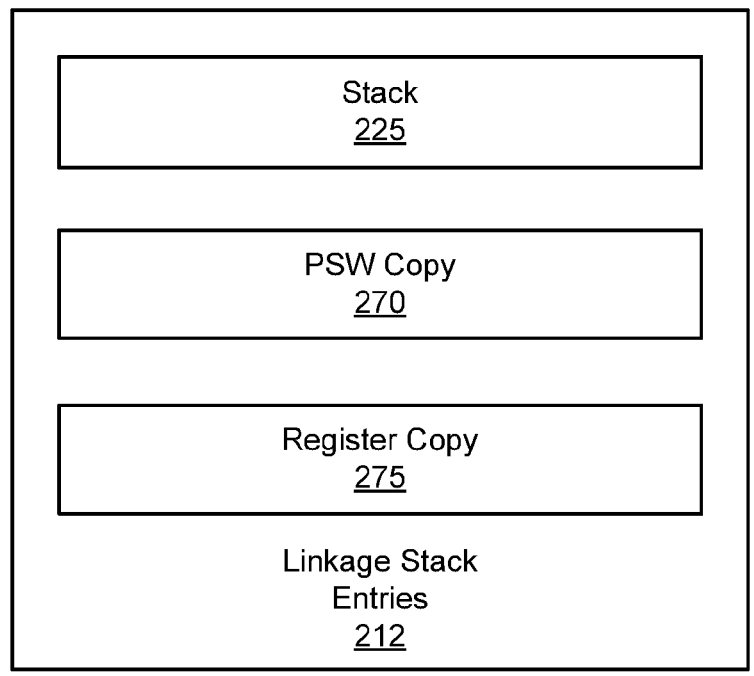
FIG. 5 is a schematic block diagram illustrating one embodiment of linkage stack entries.

FIG. 5 is a schematic block diagram illustrating one embodiment of linkage stack entries 212. The linkage stack entries 212 may be the stack block 210 of FIG. 3. The linkage stack entries 212 include a stack 225 storing data. In addition, the linkage stack entries 212 include a program status word copy 270 that is a copy of the program status word 260. In one embodiment, the program status word copy 270 is snap shot copy of the program status word 260 when the linkage stack entries 212 are created.

In addition, the linkage stack entries 212 may include a register copy 275 that is a copy of the registers 265. In one embodiment, the register copy 275 is snap shot copy of the registers 265 when the linkage stack entries 212 are created.

FIG. 6 is a schematic block diagram illustrating one embodiment of a virtual local storage map 230. The virtual local storage map 230 may locate processes within the address space 100. The virtual local storage map 230 may include a plurality of entries, each entry comprising a process name field 240, a start address field 245, and an end address field 250. The process name field 240 may store a process name that identifies a process. The start address field 245 may store the start address 120a for the process. The end address field 250 may store the end address 120b for the process. A process may include a plurality of entries in the virtual local storage map 230.

In one embodiment, an address range for a process may be determined from a pointer 125. The start address 120a may be determined as the start address field value that is less a pointer value by a least amount while the end address 120b may be determined as the end address field value that is great than the pointer value by the least amount.

Figure 7:
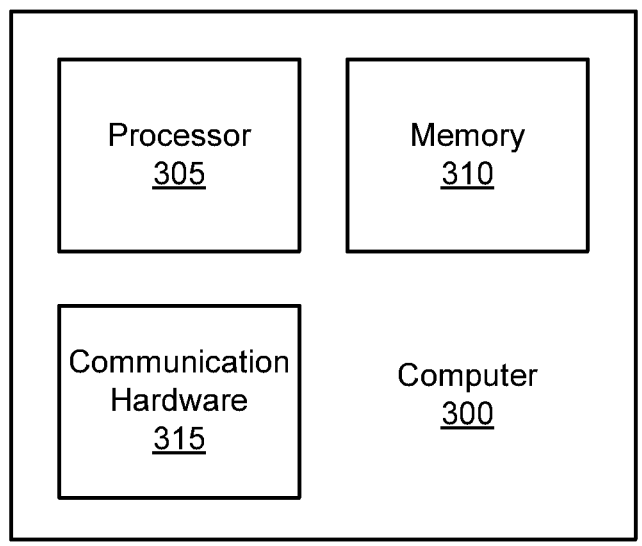
FIG. 7 is a schematic block diagram illustrating one embodiment of a computer.

FIG. 7 is a schematic block diagram illustrating one embodiment of a computer 300. The computer 300 includes a processor 305, a memory 310, and communications hardware 315. The memory 310 may be a semiconductor device, a hard disk drive, an optical storage device, a holographic storage device, a micromechanical storage device, or combinations thereof. The memory 310 may store computer readable program code. The processor 305 may execute the computer readable program code. The communication hardware 315 may communicate with other devices. In one embodiment, the memory 310 includes the address space 100.

Figure 8:
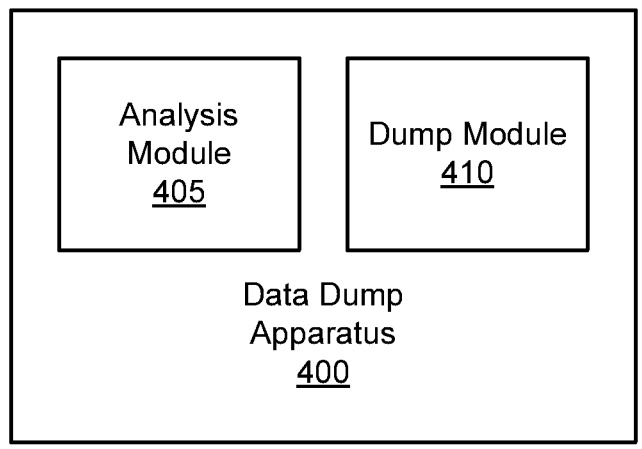
FIG. 8 is a schematic block diagram illustrating one embodiment of a data dump apparatus.

FIG. 8 is a schematic block diagram illustrating one embodiment of a data dump apparatus 400. The apparatus 400 includes an analysis module 405 and a dump module 410. The analysis module 405 and the dump module 410 may be embodied in a computer readable storage medium such as the memory 310. The computer readable storage medium may store computer readable program code executable by the processor 305 to perform the functions of the apparatus 400.

The analysis module 405 may identify each abending task of a job 105 and identify each stack block 210 of each abending task. The dump module 410 saves only stack block data from the identified stack blocks 210 as dump data.

Figure 9:
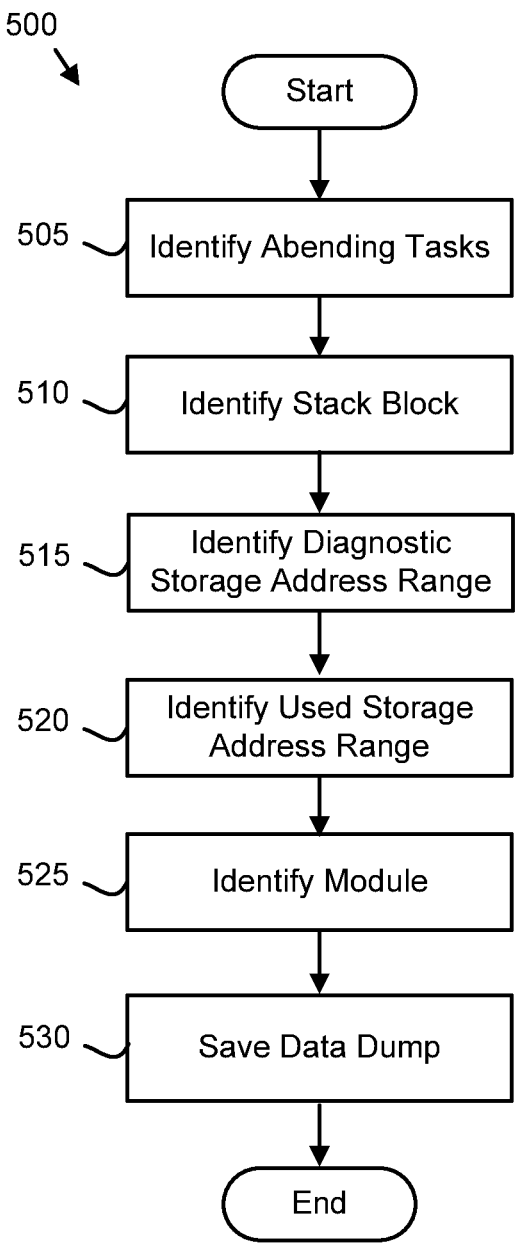
FIG. 9 is a schematic flow chart diagram illustrating one embodiment of a data dump analyzing and reducing method.

FIG. 9 is a schematic flow chart diagram illustrating one embodiment of a data dump analyzing and reducing method 500. The method 500 may perform the functions of the apparatus 400. In one embodiment, the method is performed by a computer readable storage medium such as the memory 310 storing computer readable program code. The computer readable program code may be executable by the processor 305.

The method 500 starts, and in one embodiment, the analysis module 405 identifies 505 abending tasks. In one embodiment, the analysis module 405 reads the completion code 215 from a task control block 205 of a job 105. The analysis module 405 may further identify 505 that the task is abending from one or more specified completion codes. The analysis module 405 may identify 505 all abending tasks for the job 105. In addition, the analysis module 405 may identify 505 all abending tasks for all jobs 105.

The analysis module 405 may further identify 510 each stack block 210 of each abending task. A stack block 210 may be a request block 235. Alternatively, the stack block 210 may be linkage stack entries 212. In one embodiment, the identifying 510 a stack block 210 includes calculating a stack block address range. The virtual local storage map 230 may be used to calculate the stack block address range. For example, a stack block name may be used as an index to a corresponding process name 240 in the virtual local storage map 230. The start address 120a for the stack block 210 may be retrieved from a start address field 245. In addition, the end address 120b may be retrieved from the end address field 250. Alternatively, the stack block address range may be calculated from the pointer 125.

In one embodiment, the analysis module 405 identifies 515 a diagnostic storage address range for diagnostic storage 115 for the stack block 210. The diagnostic storage 115 may store diagnostic data. The analysis module 405 may employ the virtual local storage map 230 to identify 515 the diagnostic storage address range.

In one embodiment, the analysis module 405 identifies 520 a used storage address range for used storage 130 for the stack block 210. The used storage 130 may store data employed by the job 105. The analysis module 405 may employ the virtual local storage map 230 to identify 515 the used storage address range.

In one embodiment, the analysis module 405 identifies 525 a module 110 for the stack block 210. The module 110 may perform a specified function for the stack block 210. The analysis module 405 may further calculate a module address range for the module 110. In a certain embodiment, the module address range is calculated using a virtual local storage map 230.

The dump module 410 may save 530 only stack block data from the identified stack blocks 210 as dump data and the method 500 ends. In one embodiment, the dump data is saved 530 to a storage device. The dump data may include only the data in the stack block address range. In addition, the dump module 410 may append the data in the diagnostic storage address range to the dump data. In a certain embodiment, the dump module 410 appends the data in the use storage address range to the dump data. The dump module 410 may also append the data in the module address range to the dump data.

By limiting the dump data to specified address ranges, the method 500 may significantly reduce the quantity of dump data. The dump data for a job 105 that may address a very large address space may be reduced to the most relevant data of the address space. As a result, the storage requirements for the dump data are reduced. In addition, the dump data is more easily stored and parsed.

Figure 10:
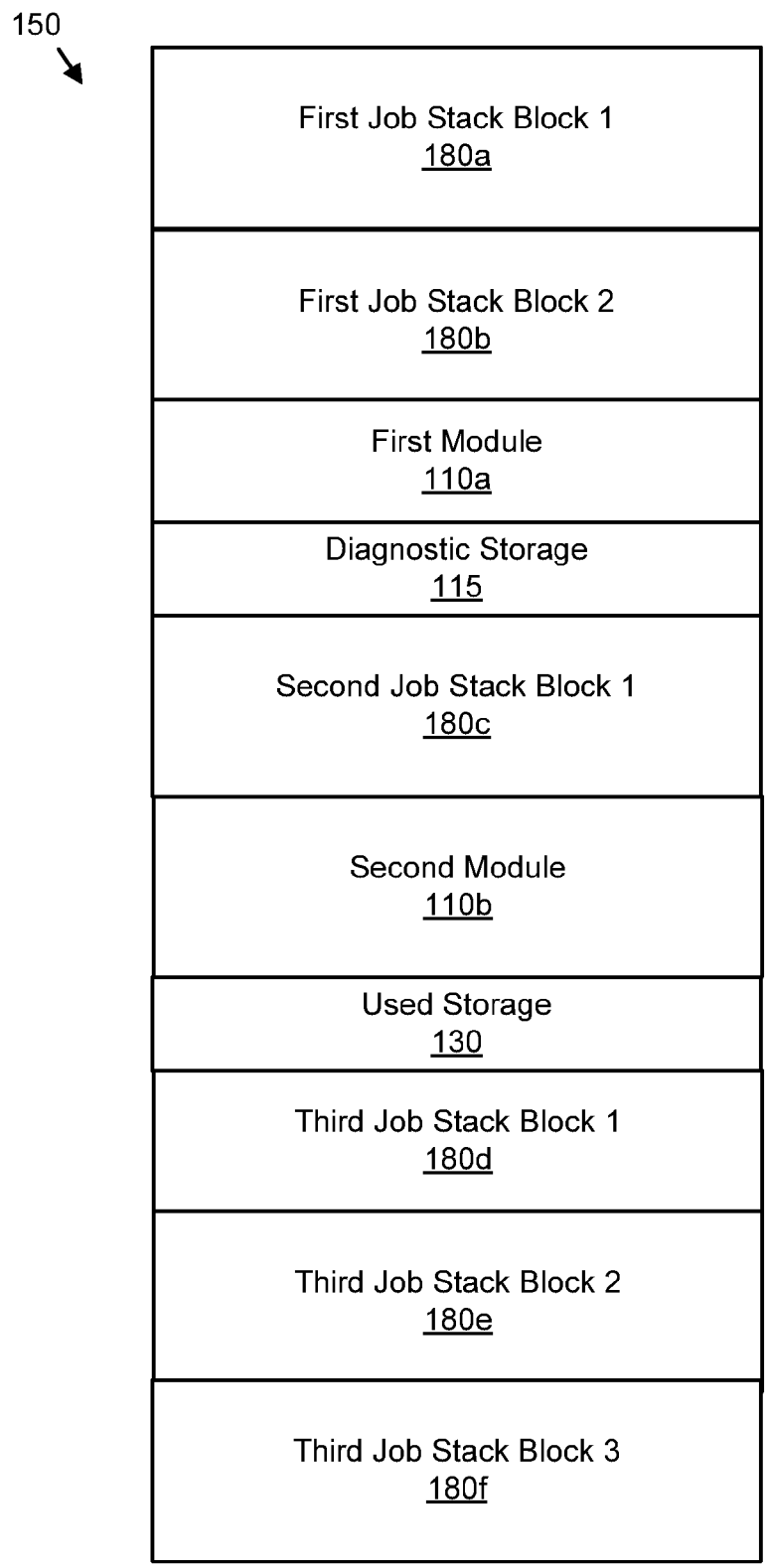
FIG. 10 is a schematic block diagram illustrating one embodiment of dump data.

FIG. 10 is a schematic block diagram illustrating one embodiment of dump data 150. The dump data 150 is exemplary of the dump data generated by the apparatus 400 and the method 500 from an address space such as the address space 100 of FIG. 1.

In the depicted embodiment, only the address ranges of the first job stack block 1 180a and the first job stack block 2 180b are stored for the first job 105a. In one embodiment, the address range for the first module 110a and diagnostic storage 115 for the first job 105a are also stored with the dump data 150. Address ranges for a second job stack block 1 180c are stored for the second job 105b. In a certain embodiment, the address ranges for the second module 110b and the used storage 130 are also stored for a second job 105b.

In addition, address ranges for a third job stack block 1 180d, a third job stack block 2 180e, and a third job stack block 3 180f are stored for the third job 105c. The embodiments described herein analyze and reduce the data for abending tasks in a job 105. As a result, significantly less storage is needed to store the dump data 150.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a computer readable storage medium storing computer readable program code executable by a processor, the computer readable program code comprising:
an analysis module identifying each abending task of a job comprising a job address space, identifying each stack block of each abending task within the job address space, each stack block comprising a request block comprising a register copy that is copy of job registers when the request block was created, identifying a module for each stack block that performs a function for the stack block and has a module address range outside of the job address space, and calculating the module address range for the module using a virtual local storage map indexed by a corresponding stack block; and
a dump module saving only stack block data from the identified stack blocks within the job address space and data from the module address range to dump data.

2. The apparatus of claim 1, wherein identifying the abending task comprises examining a task control block for a specified completion code.

3. The apparatus of claim 1, wherein identifying each stack block comprises calculating a stack block address range and each stack block comprises a program status word copy that is a copy of a program status word when the request block was created.

4. The apparatus of claim 1, the analysis module further identifying a diagnostic storage address range for each stack block and appending diagnostic storage address range data to the dump data.

5. The apparatus of claim 1, the analysis module further identifying a used storage address range for each stack block and appending used storage address range data to the dump data.

6. A method for analyzing and reducing dump data comprising:
identifying, by use of a processor, each abending task of a job comprising a job address space;
identifying each stack block of each abending task within the job address space, each stack block comprising a request block comprising a register copy that is copy of job registers when the request block was created;
identifying a module for each stack block that performs a function for the stack block and has a module address range outside of the job address space;
calculating the module address range for the module using a virtual local storage map indexed by a corresponding stack block; and
saving only stack block data from the identified stack blocks within the job address space and data from the module address range to dump data.

7. The method of claim 1, wherein identifying the abending task comprises examining a task control block for a specified completion code.

8. The method of claim 6, wherein identifying each stack block comprises calculating a stack block address range and each stack block comprises a program status word copy that is a copy of a program status word when the request block was created.

9. The method of claim 8, wherein a Z/OS® file system comprises the stack block address range.

10. The method of claim 6, further comprising identifying a diagnostic storage address range for each stack block and appending diagnostic storage address range data to the dump data.

11. The method of claim 6, further comprising identifying a used storage address range for each stack block and appending used storage address range data to the dump data.

12. The method of claim 6, wherein the stack block is selected from the group consisting of a request block and a linkage stack entry.

13. A computer program product for analyzing and reducing dump data, the computer program product comprising:
a non-transitory computer readable storage medium having computer readable program code embodied therein, the computer readable program code configured to:
identify each abending task of a job comprising a job address space;

identify each stack block of each abending task within the job address space, each stack block comprising a request block comprising a register copy that is copy of job registers when the request block was created;

identify a module for each stack block that performs a function for the stack block and has a module address range outside of the job address space;

calculate the module address range for the module using a virtual local storage map indexed by a corresponding stack block; and save only stack block data from the identified stack blocks within the job address space and data from the module address range to dump data.

14. The computer program product of claim 13, wherein identifying the abending task comprises examining a task control block for a specified completion code.

15. The computer program product of claim 14, wherein identifying each stack block comprises calculating a stack block address range and each stack block comprises a program status word copy that is a copy of a program status word when the request block was created.

16. The computer program product of claim 13, the computer readable program code further identifying a diagnostic storage address range for each stack block and appending diagnostic storage address range data to the dump data.

17. The computer program product of claim 13, the computer readable program code further identifying a used storage address range for each stack block and appending used storage address range data to the dump data.

* * * * *